(12) United States Patent
De Coulon et al.

(10) Patent No.: US 6,175,232 B1
(45) Date of Patent: Jan. 16, 2001

(54) MICROMACHINED INDUCTIVE SENSOR HAVING CAPACITIVELY DECOUPLED COILS

(75) Inventors: Yves De Coulon, Thielle-Wavre; Michel Alain Chevroulet, Neuchatel, both of (CH)

(73) Assignee: CSEM Centre Suisse D'Electronique et de Microtechnique SA, Neuchatel (CH)

( * ) Notice: Under 35 U.S.C. 154(b), the term of this patent shall be extended for 0 days.

(21) Appl. No.: 09/056,544

(22) Filed: Apr. 7, 1998

(30) Foreign Application Priority Data

Apr. 7, 1997 (FR) .................................................. 97 04218

(51) Int. Cl.$^7$ ............................... G01D 5/22; G01B 7/14
(52) U.S. Cl. ................................. 324/207.12; 324/207.19
(58) Field of Search .................... 324/207.17, 207.12, 324/207.19, 225, 234, 238, 239, 240, 242, 243; 336/200, 232, 69

(56) References Cited

U.S. PATENT DOCUMENTS

| | | | |
|---|---|---|---|
| 4,810,966 | * 3/1989 | Schmall | 324/207.17 |
| 5,205,171 | 4/1993 | O'Brien et al. | |
| 5,574,367 | * 11/1996 | Logue | 324/207.17 |

FOREIGN PATENT DOCUMENTS

| | | |
|---|---|---|
| 0552001 | 7/1993 | (EP) . |
| 0745858 | 6/1996 | (EP) . |

OTHER PUBLICATIONS

"An integrated micro fluxgate magnetic sensor", Patent Abstracts of Japan, Sensors and Actuators A55 (1996), pp. 121–126.

* cited by examiner

*Primary Examiner*—Walter E. Snow

(57) ABSTRACT

This micromachined inductive sensor is used to detect, without contact and through the intermediary of a radiated alternating magnetic field, the position and/or the movement of an object capable of modifying this magnetic field and including for this purpose at least one discontinuity. The sensor comprises a planar transmitter coil for transmitting the alternating magnetic field and planar receiver coils located so as to sense a determined portion of said field and the variations of this magnetic portion sensed due to the discontinuity of the object. The coils are disposed on a common substrate and obtained by selective photolithography operations. According to the invention, in the areas of the substrate in which the transmitter coil is contiguous with a receiver coil, there is provided at least one shielding band electrically independent of the coils and connected to a reference potential. The shielding band is formed from a metallization layer deposited on the substrate.

12 Claims, 4 Drawing Sheets

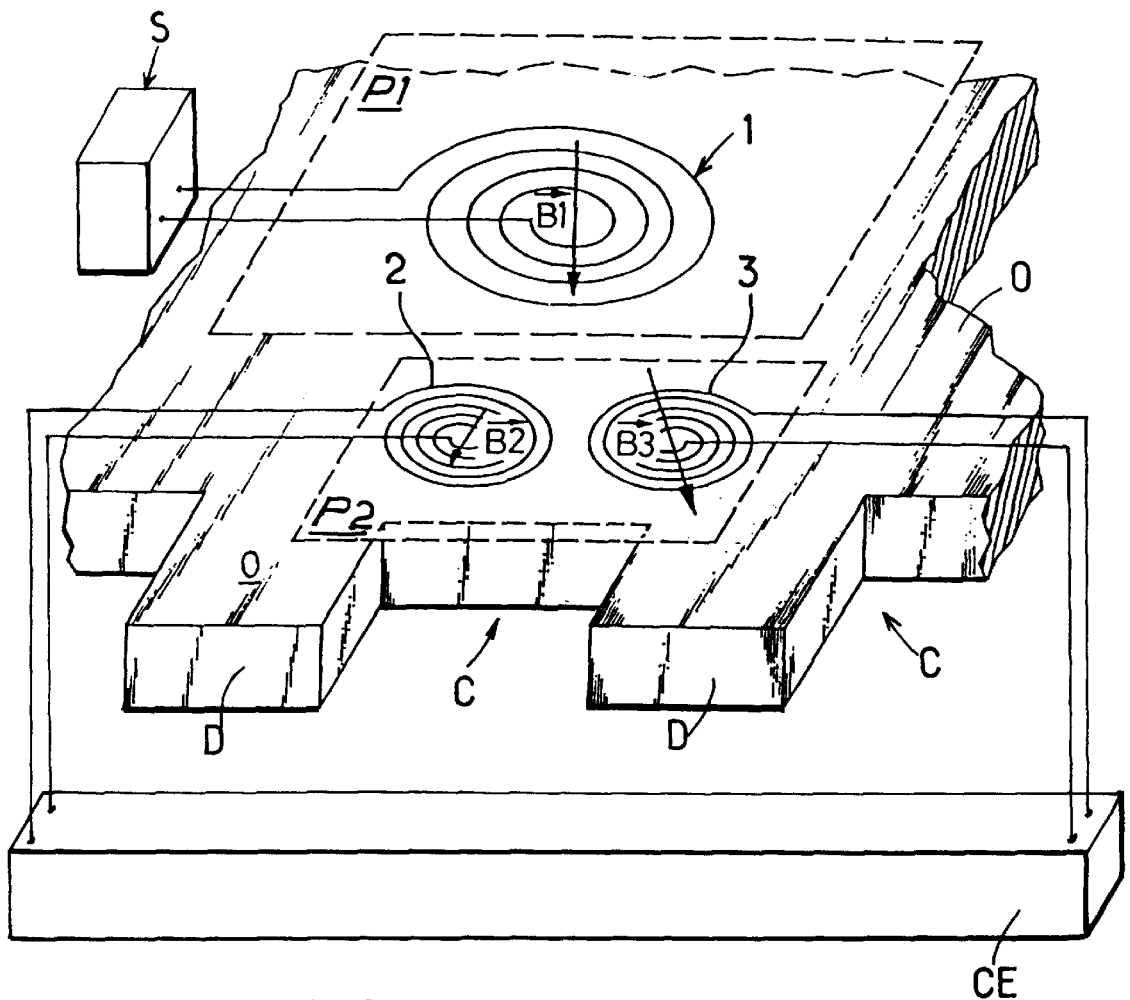
FIG.: 1
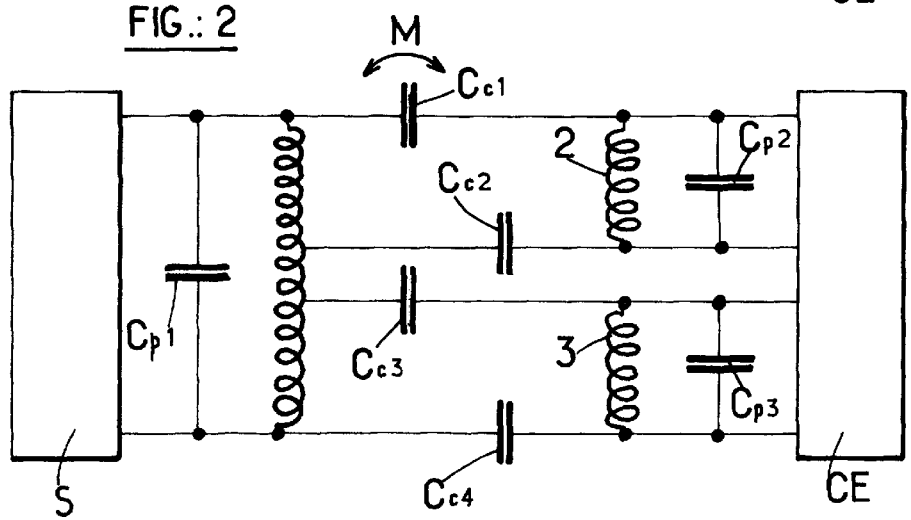
FIG.: 2

FIG.: 3
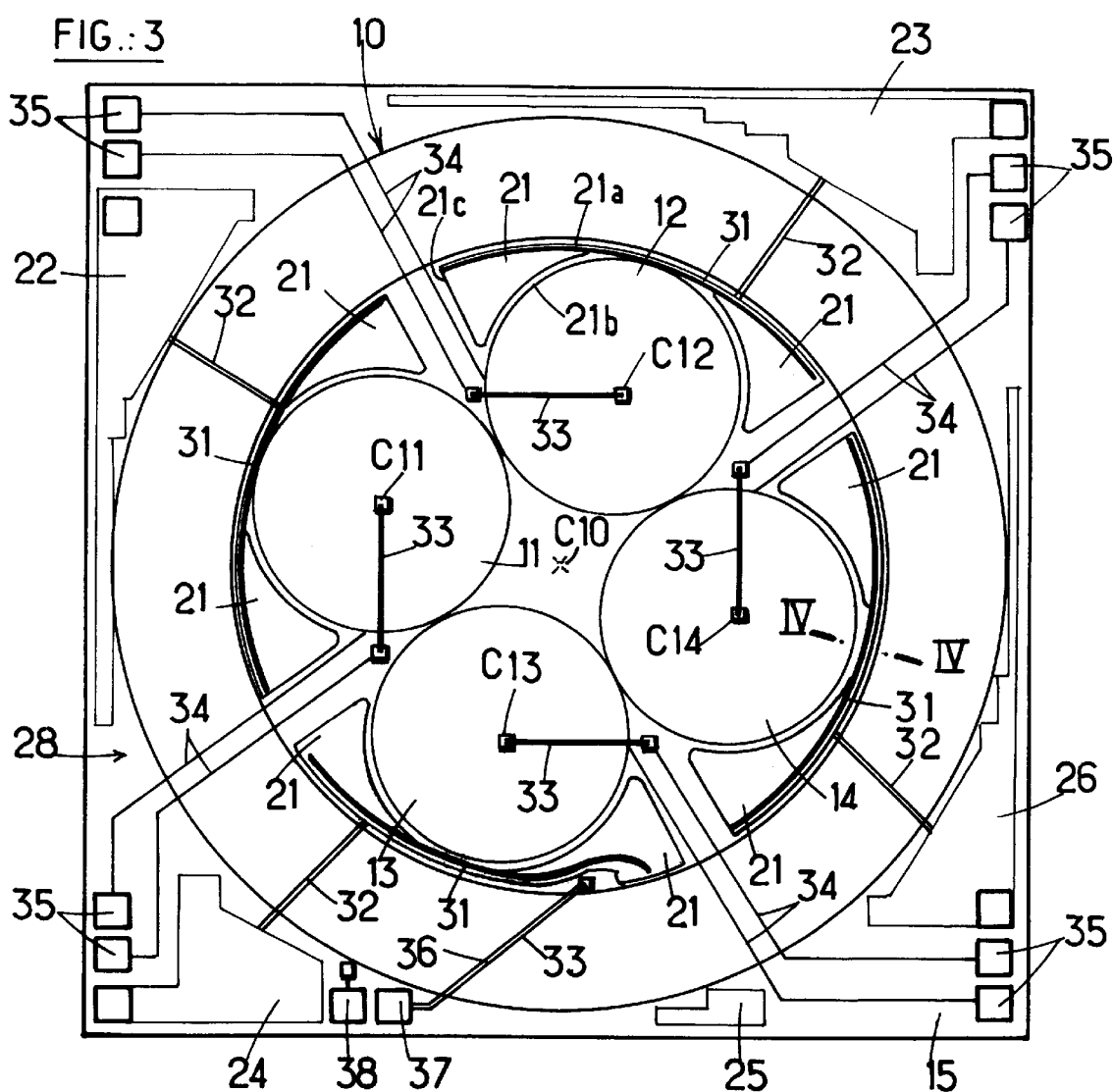
FIG.: 4
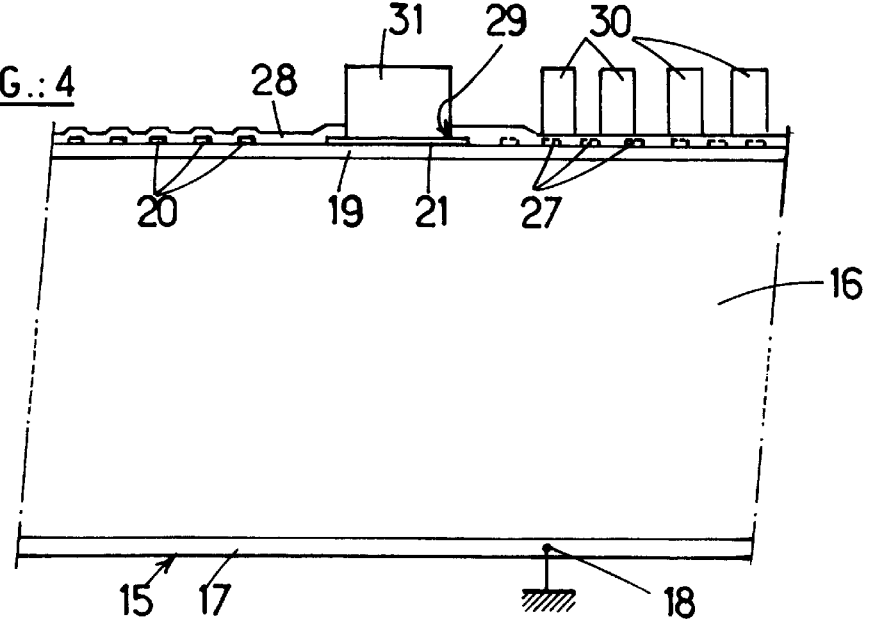

FIG.: 5
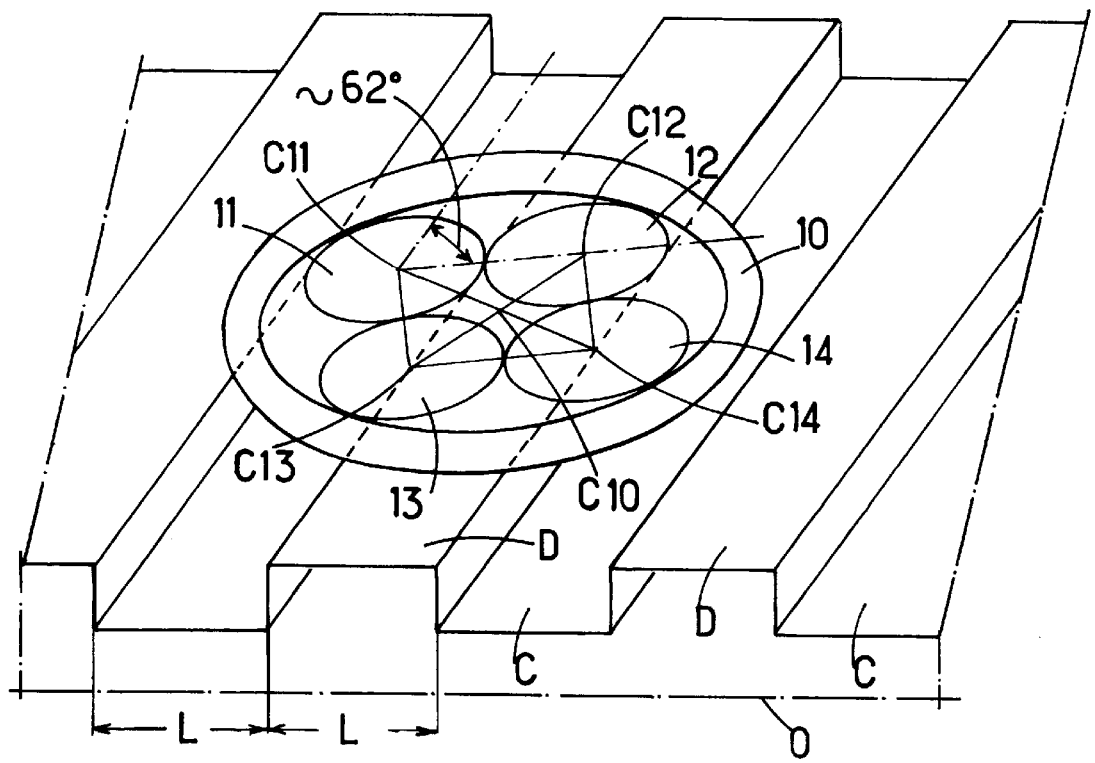
FIG.: 6
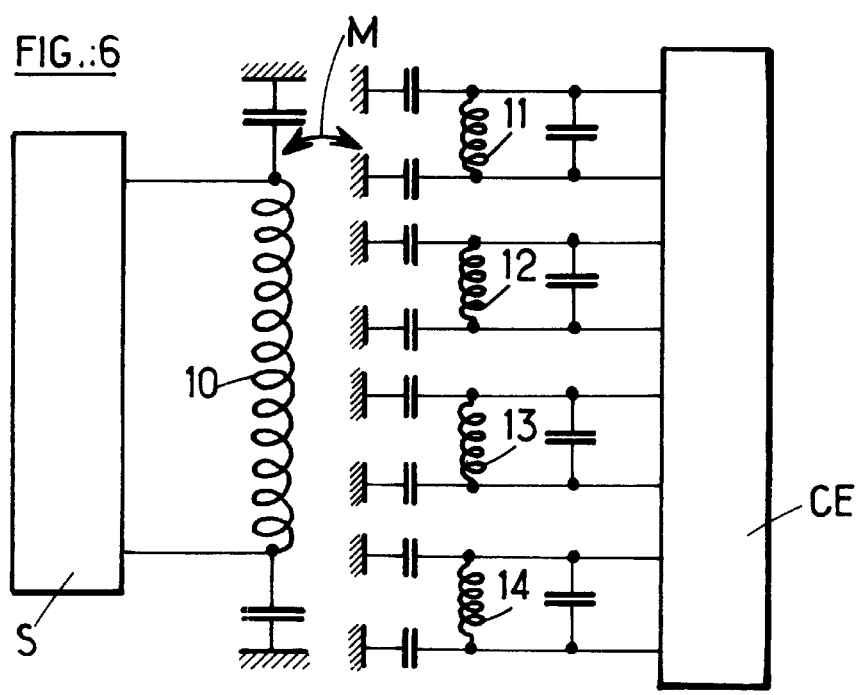

FIG.:7
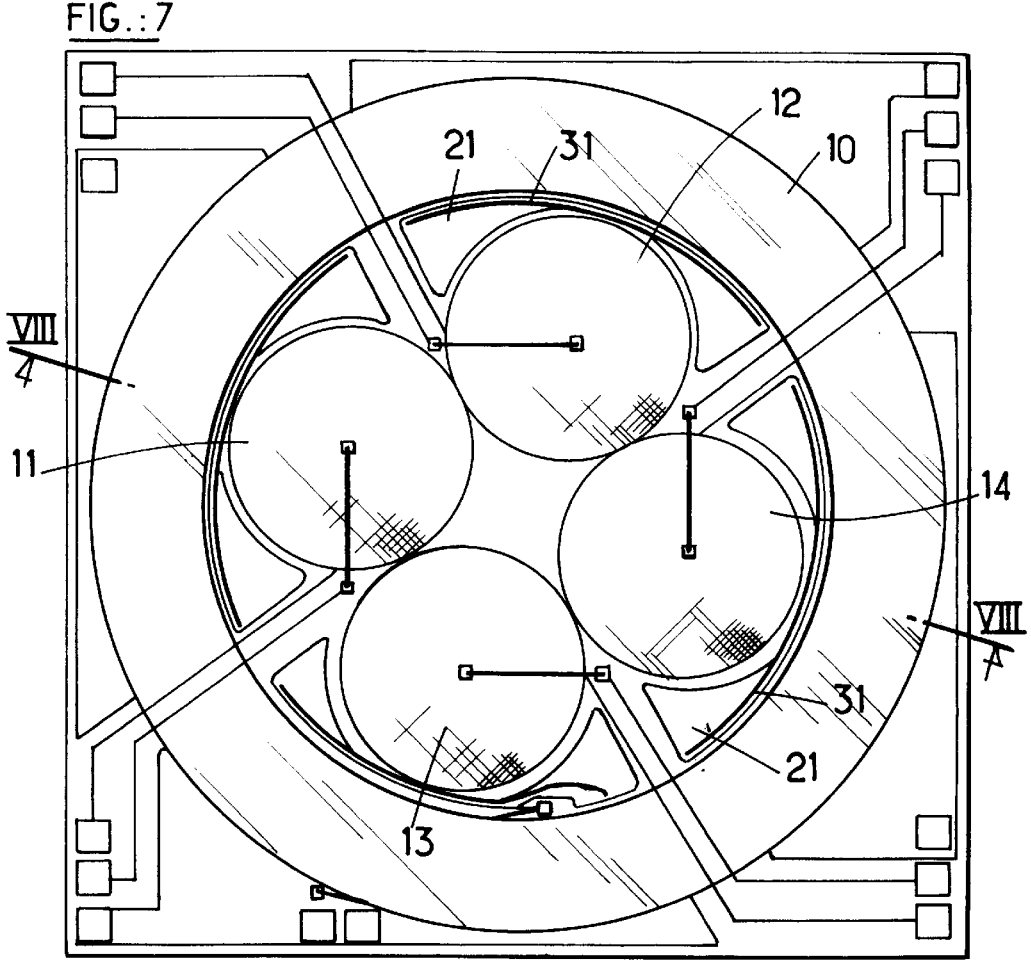
FIG.:8
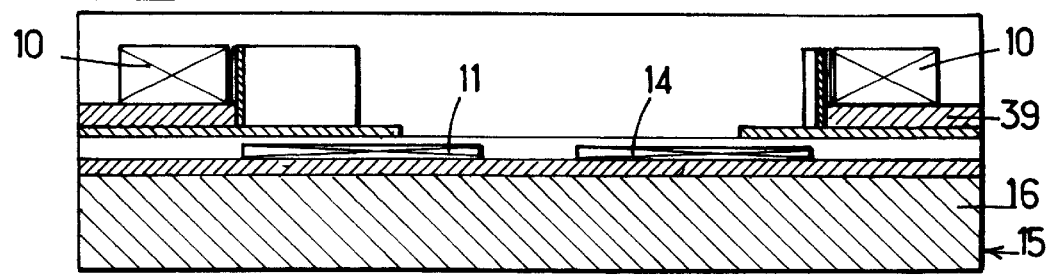
FIG.:9
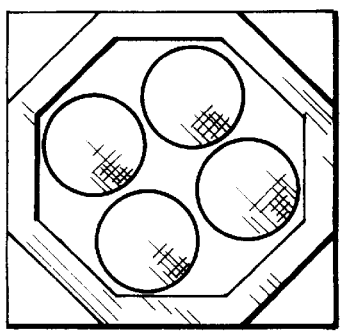
FIG.:10
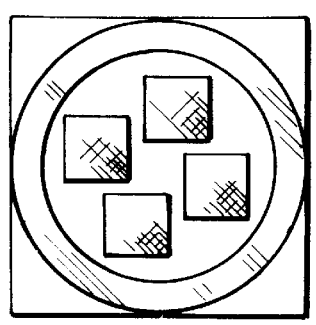
FIG.:11
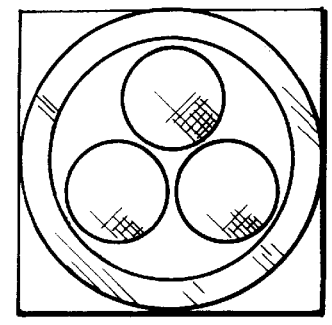

MICROMACHINED INDUCTIVE SENSOR HAVING CAPACITIVELY DECOUPLED COILS

BACKGROUND OF THE INVENTION

1. Field of the Invention

The invention relates to a micromachined inductive sensor for detecting, without contact and through the intermediary of a radiated alternating magnetic field, the position and/or the movement of an object capable of modifying this magnetic field.

More particularly, the invention relates to a sensor of this type comprising at least one primary inductive coil and at least one secondary detecting coil of planar design, this term meaning that the thickness of the windings of the coils has a value substantially lower than the other dimensions of the coils and that the coils are disposed on a flat support

2. Description of the prior art

Sensors comprising planar coils have the advantage that they can be produced by techniques similar to those normally employed for the production of integrated circuits with which they can also advantageously be associated on the same silicon wafer, the integrated circuit then being in particular formed by the circuits for processing the measurement signal provided by the sensor.

Such a sensor was described in a patent application filed in Switzerland on Apr. 29, 1996 in the name of the Applicant and having the title: "Device for detecting position and movement using magnetic field variation".

FIG. 1 of the appended drawings represents by way of reminder a very simplified diagram in perspective view of a sensor according to this patent application. It comprises a spirally wound planar transmitter sensor 1 which is connected to an alternating voltage source S transmitting a current into this coil, the coil 1 thus transmitting an inductive magnetic flux B1 perpendicular to the plane P1 of the coil 1.

The sensor also includes two planar receiver coils 2 and 3 also spirally wound and located in a plane P2 in the sensor with respect to the transmitter coil 1 in such a way that they both receive a determined portion of the magnetic flux B1 generated by the transmitter coil 1. These portions of magnetic flux are denoted respectively B2 and B3 on FIG. 1.

The receiver coils 2 and 3 are connected to an operating circuit CE the function of which is to process, preferably differentially, the measurement signals obtained through the intermediary of the two receiver coils. A detailed description of this circuit can be found in the patent application cited above.

The sensor is capable of detecting the position and/or the movement of an object O which, because of its structure and the material from which it is made, is capable of modifying the flux induction conditions in the two receiver coils 2 and 3. To this end, the object O has a repetitive or non-repetitive structural discontinuity which, when it passes in front of the sensor, makes it possible to obtain the changes in the induction conditions. In the example in FIG. 1, this structural discontinuity is formed by a series of successive teeth D and notches C provided on the edge of the object O. In the example shown, the general plane of the object O is parallel to the planes of the coils 1 and 2 and it can be assumed that the object O is a toothed wheel for example, driven in rotation around an axis which is disposed parallel to the axes of the coils 1 to 3. However, the mutual attitudes of the sensor and the object O are not determining factors provided that the structural discontinuity of the object O can modify the induction conditions which, to simplify, will be the case if a certain distance between the sensor and the object O is respected for a given intensity of the inductive current.

Since the induction current is alternating, for example a sinusoidal current of determined frequency, alternating voltages are induced in the receiver coils 2 and 3. These voltages will have amplitudes determined by the relative positions of the sensor and the object; the amplitudes will be constant if the object O is not in movement. However, if this object O is moved, for example under the impulsion of a rotation movement around its axis, the voltages induced will be modulated by the movement in front of the sensor of the structural discontinuity of the object, and this modulation can be used in the circuit CE to extract information signals concerning movement of the object O. It will be understood that the signals of the different receiver coils, which are offset with respect to a given discontinuity, can serve at any time to determine the speed, distance, acceleration or deceleration, direction of movement or position of the object O.

Since this sensor works through inductive coupling, it can be compared to a transformer in which the transmitter coil 1 is the primary and in which the receiver coils 2 and 3 are the secondaries. In the earlier example described hereinabove, this transformer comprises no flux guiding elements. However, such an element can be provided for example in the form of a layer of ferromagnetic material that can be disposed above the coils 1 and 3, for example.

This "transforming" sensor can work with objects O made of a magnetic material or, also, of a non-magnetic but electrically conductive material in which the magnetic field of the transmitter coil 1 will be capable of generating eddy currents in turn disturbing the magnetic fluxes of the receiver coils 2 and 3, such disturbances finally leading to the required signal being obtained in the operating circuit CE.

The development of the sensor thus designed by the Applicant led to the finding that the coils are inter-coupled not only magnetically, but also capacitively. This is not surprising in itself, because capacitive coupling phenomena are found in any system formed from magnetically coupled coils. In themselves, these phenomena have little effect in sensor systems of macroscopic size when the influence of undesired capacitances on the desired signal hardly exceed 1%, in general.

However, in the sensors concerned here and which are of microscopic size (all the coils described hereinabove can have overall dimensions in the order of only a few millimeters), undesired capacitances can cause undesired influences the extent of which can be up to 100% of the desired signal, if it is also taken into consideration that the working frequency of the sensor is relatively high (in the order of 1 MHz, for example).

FIG. 2 of the annexed drawings shows an equivalent simplified diagram of the sensor that has just been described, the magnetic coupling being symbolized by the double arrow M.

This diagram shows that each coil 1, 2 and 3 is in fact associated with a parallel undesired capacitance respectively Cp1 to Cp3. These capacitances certainly have a harmful influence, but they can be canceled out or at least taken into account in the current source S, on the one hand, and in the operating circuit CE, on the other hand. However, it is found that other undesired capacitances affect the behavior of the sensor. The coils 1 to 3 are intercoupled not only magnetically, but also capacitively, shown in FIG. 2 by the capacitances Cc1 to Cc4, connecting each end of a receiver coil to the transmitter coil, as represented.

Unlike the parallel capacitances Cp1 to Cp3, the coupling capacitances Cc1 to Cc4 between the coils 1 to 3 are not generally equal and can be canceled out or eliminated electronically only with means of a complexity that would almost nullify the advantages of simplicity of construction that can be obtained with the sensor described hereinabove. In addition, these undesired coupling capacitances unfavorably affect the result of the measurement that the sensor may be expected to obtain. First of all, they contribute to the signals applied by the receiver coils 2 and 3 through components that are in phase opposition with these desired signals such that these components are likely to cancel completely the desired signals in coils 2 and 3. If however, which is practically always the case however much care is taken in manufacture, the undesired capacitances are not equal for the two receiver coils, they destroy the differential effect that the coils have on the measurement signal.

SUMMARY OF THE INVENTION

The aim of the invention is to provide a sensor of the type that has just been described, but in which the influence of the capacitive coupling between the transmitter and receiver coils is completely eliminated.

The object of the invention is therefore a micromachined inductive sensor for detecting, without contact and through the intermediary of a radiated alternating magnetic field, the position and/or the movement of an object capable of modifying this magnetic field and including for this purpose at least one discontinuity, this sensor comprising at least one planar transmitter coil for transmitting this alternating magnetic field and at least one planar receiver coil located so as to sense a determined portion of this field and the variations of this magnetic portion sensed due to the discontinuity of the object, these coils being disposed on a common substrate and obtained by selective photolithography operations, wherein at least in the areas of the substrate in which the transmitter coil is contiguous with the receiver coil, there is provided at least one shielding band electrically independent of these coils and connected to a reference potential, this shielding band being formed from a metallization layer deposited on the substrate.

The result of these features is that all the capacitances capable of coupling the coils to each other are diverted to a reference potential such as ground, so that they can no longer influence the measurement signal produced by the sensor.

Other objects and features of the present invention will be more readily understood from the following detailed description, given only by way of example, when read in conjunction with the appended drawings.

BRIEF DESCRIPTION OF THE DRAWINGS

FIG. 1 already described is a schematic diagram showing the construction of a position and/or movement sensor in accordance with an earlier embodiment of the Applicant.

FIG. 2, also already described, is a simplified equivalent diagram of the sensor in FIG. 1.

FIG. 3 is a plan view of a semiconductor chip on which is implemented a position and/or movement sensor in accordance with a first embodiment of the invention.

FIG. 4 is an enlarged partial sectional view of this sensor, the view being along the partial sectional line IV—IV in FIG. 3.

FIG. 5 is a diagrammatic perspective view of the sensor in accordance with the invention to illustrate a preferred disposition of the receiver coils with respect to an object and the discontinuity that the object presents.

FIG. 6 is a simplified equivalent diagram of the sensor according to the embodiment in FIGS. 3 to 5.

FIG. 7 is a plan view of a sensor designed according to a second embodiment of the invention.

FIG. 8 is a sectional view of the sensor in FIG. 7, along the sectional line VIII—VIII in FIG. 7.

FIGS. 9 to 11 are plan views of other possible configurations of the sensor in accordance with the invention.

DETAILED DESCRIPTION OF THE PREFERRED EMBODIMENTS

FIGS. 3 to 6 show a first embodiment in accordance with the invention in which the sensor includes, by way of example, a planar transmitter coil 10 and four planar receiver coils 11 to 14, which it is possible to combine to perform differential measurements. However, the invention also applies to sensor configurations comprising only two or three receiver coils, or even more than four receiver coils. The number of receiver coils used determines the resolution of the sensor.

In the embodiment shown, to obtain as favorable a magnetic coupling as possible, the centers C11 to C14 of the receiver coils are advantageously located at the four corners of a square and the transmitter coil 10 advantageously encircles these receiver coils 11 to 14, its center C10 coinciding with the point of intersection of the diagonals of this square (see in particular FIG. 5).

To clarify, the wafer 15 on which the sensor is disposed can be square with a side length of 4 mm.

The wafer 15 is formed from a substrate 16, in which can be implemented a circuit performing the functions of either of the blocks S and CE in FIG. 6, or of the two blocks at the same time. One of the sides (here the underside) of the wafer 15 is coated with a conductive layer 17, in particular of aluminum, to serve as the ground plane for the sensor also connected to the substrate. For this purpose, this layer 17 is provided with a connector terminal shown at 18 on FIG. 4. The opposite side of the substrate 16 is coated with an insulating layer 19 of silicon oxide, for example.

On the oxide layer 19 is deposited selectively by conventional photolithographic techniques a first metallization layer, of aluminum for example, this layer having several functions.

First, this first layer is configured to form the receiver coils 11 to 14. Each of them are formed in spirals with a number of turns such that the coil can sense a maximum amount of magnetic energy from the transmitter coil 10. The sectional view in FIG. 4 shows only a few of these turns denoted by 20 with respect to receiver coil 14.

According to an essential feature of the invention, the first metallization layer also constitutes a plurality of shielding bands 21 intended more particularly to provide capacitive decoupling of the transmitter coil 10 with respect to receiver coils 11 to 14. In the embodiment shown, these shielding bands 21 constitute electrically separate metallic segments of the coils each having an outer edge 21a following the internal profile of the transmitter coil 10, an inner edge 21b following the internal profile of the associated receiver coil 11 to 14 and a lateral edge 21c which extends approximately radially. Thus, two shielding bands 21 are associated with each receiver coil 11 to 14.

The first metallization layer also constitutes other parts such as 22 to 26 disposed outside the transmitter coil 10 and also forming shieldings for this coil. Advantageously, the first metallization layer can be extended under the transmitter coil 10, which in FIG. 4 is symbolized by small rectangles 27 under the transmitter coil 10, although the metallic layer can be continuous in this area.

The shielding bands 21 to 26 are intended to be connected to a reference potential, advantageously ground. They are therefore preferably connected to the terminal 18 (FIG. 4), by means not shown.

The first metallization layer is covered with aso-called intermetallic insulation layer 28 except for a few arc-shaped areas along the internal profile of the transmitter coil 10 and located close to the inner edge of this coil. Such an area is indicated at 29 in FIG. 4.

The sensor also has a second metallization layer, preferably implemented in copper and deposited by conventional selective photolithographic techniques on the intermetallic insulation layer 28.

This second metallization layer constitutes firstly the transmitter coil 10. It can be noted by way of indication only that each turn of the transmitter coil 10 can have a height of 10 μm, its spiral having a lay of 8 μm, for example. In FIG. 4, a few turns of the coil 10 are visible identified by the reference 30. Such a transmitter coil can absorb a power of 50 mW, for example.

The second metallization layer also constitutes shielding elements 31 in the form of conductive arcs which at the time of formation of this layer are overlaid on the open areas 29 in the insulation layer 28. These conductive arcs preferably have a height substantially equal to that of the transmitter coil 10 and can also contribute to capacitive decoupling. In addition, they are respectively in direct contact with two adjacent shielding bands 21 associated with each receiver coil 11 to 14. These conductive arcs are thus formed at the same time as the turns 30 of the transmitter coil 10, their height also being approximately 10 μm, in the present example.

The second metallization layer can also include connecting tracks such as 32 linking the bands 21 inside the coil 10 to the bands 23 to 26 outside the coil 10. Other connecting tracks 33 are provided on the second metallization layer to provide the respective electrical links between, on the one hand, the centers C11 to C14 of receiver coils 11 to 14 and respective connecting wires 34 leading to contact terminals 35 provided on the edge of the wafer 15. A similar track 36 is provided to connect the innermost turn of the transmitter coil 10 to a contact terminal 37, the outer turn of this coil being linked directly to another contact terminal 38.

The sensor can be completed by the deposition of a passivation layer and an encapsulation (not shown on the figures).

FIG. 5 illustrates that the geometric disposition of the receiver coils 11 to 14 chosen in the embodiment in FIGS. 3 and 4 enables an efficient position of the sensor to be achieved, giving a maximum differential signal and a phase shift of 90°, with respect to an object O the discontinuity of which is formed from a regular sequence of teeth D and notches C of the same width L. The toothing can also be curved by being formed for example on the periphery of a wheel, the general plane of which can be parallel or perpendicular to that of the sensor.

However, as already indicated, neither the shape, nor the attitude in space of the discontinuity of the object with respect to the sensor are critical provided that the discontinuity of the object can modify the magnetic field generated by the transmitter coil 10.

If the respective dispositions of the sensor and the object O are as shown in FIG. 5, or alternatively such that the transverse dimension of the toothing is perpendicular to the general plane of the sensor, and if in addition the sensor has a configuration with four receiver coils thus generating signals out of phase by 90° in these coils, it is advantageous that the diameter of the receiver coil be equal to the half pitch of the toothing of the object O, or the width L.

In addition, a measurement signal having a maximum modulation rate will be obtained if the straight lines connecting the centers C11, C12, and C13, C14 of the receiver coils 11, 12, and 13, 14 forming differential pairs are inclined approximately 62° with respect to the plane defined by one side of the toothing.

FIG. 6 is an equivalent diagram showing how the shielding elements 21 and 31 are used to decouple the coils from each other capacitively to ground. This figure also shows schematically the blocks S and CE which, as indicated hereinabove, can, either of them or both of them, be implemented in the substrate 16. About the operating circuit CE, it can be 20 noted that it can be designed to generate different types of information from the signals delivered by the receiver coils, such as position, proximity, movement (speed, direction) and distance, etc information. It can also be designed to generate shape information concerning the object O which it will be able to calculate from a reading of a plurality of sensor/measured object distances. In this respect, it can be noted that the precision of determination of the shape of an object will increase as the number of receiver coils used increases, because this number determines the resolution of the sensor. FIGS. 7 and 8 show another embodiment of the invention in which the general arrangement of the sensor conforms to that of FIGS. 3 to 6. However, whereas in the latter case, the sensor is fabricated with two levels of metallization, one aluminum and the other copper for example, in the case of FIGS. 7 and 8, fabrication is executed in three metallization stages, the receiver coils being obtained through a deposition of metal distinct from the deposition of metal leading to the formation of shielding bands 21. In addition, FIGS. 7 and 8 bear the same references as those used in FIGS. 3 to 6 to denote equivalent elements.

It will also be noted in these figures that the metallization layer serving to constitute the shielding bands extends under the transmitter coil 10 being continuous with the external shielding bands. In addition, it will be noted that the transmitter coil 10 is separated from the shielding metallization layer by an insulating layer 39.

FIGS. 9 to 11 show other possible configurations of the sensor in accordance with the invention. More precisely in FIG. 9, the sensor includes a transmitter coil which, instead of being of generally circular shape, is octagonal.

In FIG. 10, the transmitter coil is circular, while the receiver coils are square.

Finally, in FIG. 11, the sensor comprises only three receiver coils, all the coils here being circular.

It is obvious that within the scope of the invention, other configurations of the sensor are possible in terms of both the shapes of the coils and those of the shielding bands which on each occasion must be adapted to the shape of the coils.

There is claimed:

1. A micromachined inductive sensor for detecting, without contact and through the intermediary of a radiated alternating magnetic field, the position and/or the movement of an object capable of modifying said magnetic field and including for this purpose at least one discontinuity, said sensor comprising at least one planar transmitter coil for transmitting said alternating magnetic field and at least one planar receiver coil located so as to sense a determined portion of said field and the variations of said magnetic portion sensed due to the discontinuity of said object, said coils being disposed on a common substrate and formed by selective photolithography operations, wherein at least in the areas of the substrate in which said transmitter coil is contiguous with said receiver coil, there is provided at least one capacitive decoupling band electrically independent of said coils and connected to a reference potential, said capacitive decoupling band being formed from a metallization layer deposited on said substrate.

2. A sensor as claimed in claim 1, wherein said receiver coil is implemented in the same metallization layer as said capacitive decoupling band.

3. A sensor as claimed in claim 1, wherein said receiver coil is implemented in a metallization layer underlying the metallization layer in which said capacitive decoupling band is formed.

4. A sensor as claimed in claim 1, wherein said capacitive decoupling band extends beneath said transmitter coil.

5. A sensor as claimed in claim 1, further comprising a capacitive decoupling element in said contiguous area and overlaid on said capacitive decoupling band and extending from said capacitive decoupling band over a height substantially equal to that of said transmitter coil, while remaining in electrical contact with said capacitive decoupling band.

6. A sensor as claimed in claim 1, wherein said receiver coil is located inside the perimeter defined by said transmitter coil.

7. A sensor as claimed in claim 6, wherein there are at least two receiver coils forming a differential pair.

8. A sensor as claimed in claim 7, wherein there are four receiver coils forming two differential pairs disposed symmetrically around the axis of said transmitter coil.

9. A sensor as claimed in claim 8, wherein said discontinuity in said object is formed from a succession of teeth alternating with notches having a width equal to that of the teeth, wherein said coils have a diameter equal to said width and are all contiguous with each other, and wherein a straight line linking the centers of two adjacent coils is inclined at an angle of approximately 62° to the plane of the side of one of said teeth.

10. A sensor as claimed in claim 1, wherein said sensor also includes an alternating voltage source connected to said transmitter coil and implemented in an integrated manner in said common substrate.

11. A sensor as claimed in claim 1, wherein said sensor also includes an operating circuit for generating, from signals delivered by said receiver coils, different information relating to said object, including at least a plurality of position, proximity, movement (speed, direction), distance and/or shape information.

12. A sensor as claimed in claim 11, wherein said operating circuit is implemented in an integrated manner in said common substrate.

* * * * *